United States Patent [19]

Hough

[11] 4,376,967
[45] Mar. 15, 1983

[54] FRONT LOADING PROJECTION UNIT WITH WIREFORM RETENTION MEMBER

[75] Inventor: Harold L. Hough, Beverly, Mass.
[73] Assignee: GTE Products Corporation, Stamford, Conn.
[21] Appl. No.: 212,398
[22] Filed: Dec. 3, 1980
[51] Int. Cl.³ .............................................. F21V 7/00
[52] U.S. Cl. .................................. 362/306; 362/226; 362/296
[58] Field of Search .............. 362/226, 296, 389, 396, 362/306, 263, 350

[56] References Cited

U.S. PATENT DOCUMENTS 3,789,212  1/1974  Wagner ................................. 362/396
4,219,870  8/1980  Haraden .............................. 362/226

Primary Examiner—Donald P. Walsh
Attorney, Agent, or Firm—Lawrence R. Fraley

[57] ABSTRACT

An improved projection unit which enables front removal of the unit's tungsten halogen projection lamp from the unit's glass reflector. A first retention member in the form of a boxlike metallic "can" is secured to the lamp's press sealed end and held in place by a wireform which pivots to engage a planar back surface of the glass reflector to provide said securement. The wireform is positioned on the boxlike "can" and can be inserted through the reflector's rear opening during lamp positioning.

9 Claims, 4 Drawing Figures

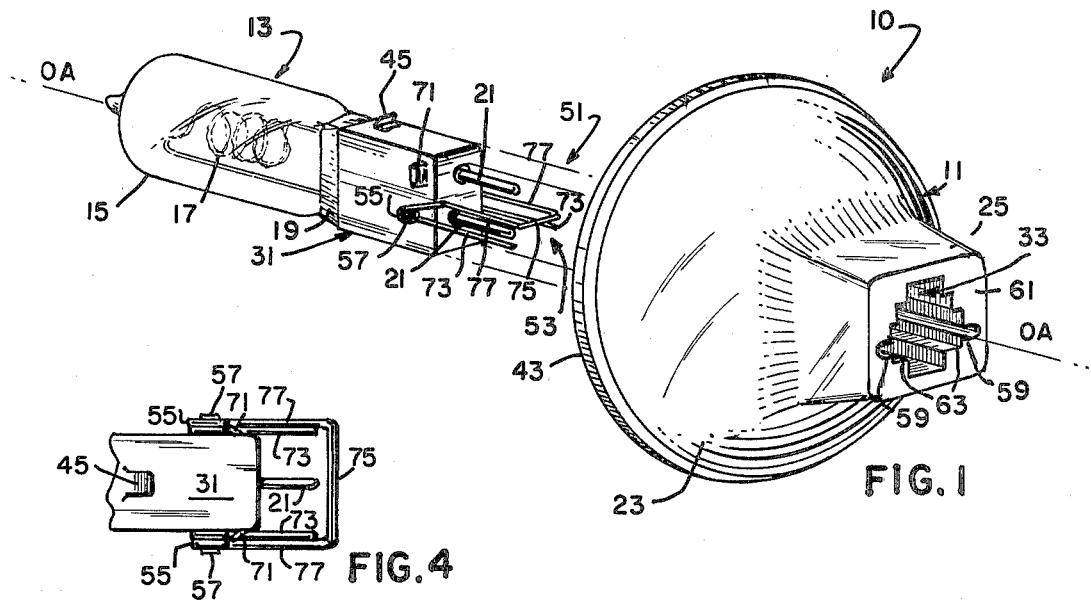
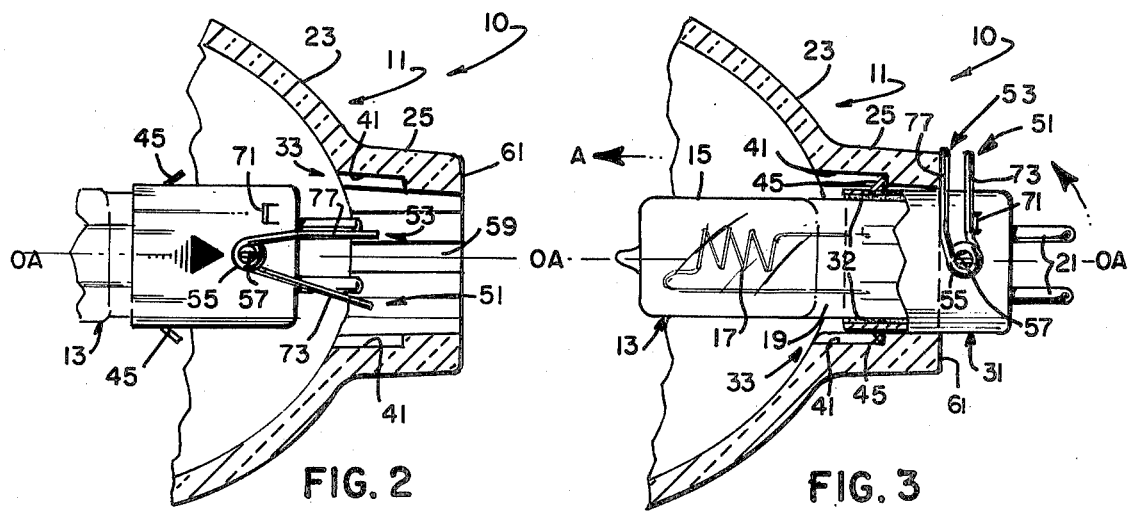

FRONT LOADING PROJECTION UNIT WITH WIREFORM RETENTION MEMBER

TECHNICAL FIELD

The invention relates to incandescent lamp and glass reflector combinations for use in projection systems such as 16 mm. movie, 35 mm slide and microfilm projectors.

BACKGROUND

In many projection units which include a preformed glass reflector and projection lamp (e.g. tungsten halogen) therein, the lamp is returned in alignment within the reflector by employing a suitable cement (e.g. sauereisen) within the reflector and about the lamp's sealed end. Examples of such arrangements are shown in U.S. Pat. Nos. 3,314,331 (Wiley) and 3,639,750 (Anthonijsz). Use of cement or a similar permanent-type bonding agent prohibits separation of the lamp and reflector in the event that replacement of either of these components is necessary. In many cases, it is only the incandescent lamp which fails and needs replacement. The aforementioned permanent bond between lamp and glass reflector was believed necessary in order to assure the essential, precise alignment between said components and between these members and other elements (e.g. film gate, projection lens) within the overall system. Alignment between reflector and lamp was usually achieved using a precisioned instrument whereupon the assembled unit was ready for insertion within a respective socket-holder arrangement, such as shown in U.S. Pat. No. 3,789,212 (Wagner). This latter positioning is usually accomplished by the projector's operator.

Mandatory replacement of both lamp and glass reflector therefore results in unnecessary waste of material which in turn adds appreciably to the overall cost of operating such systems.

The projection unit of U.S. Pat. No. 4,156,901 (Haraden et al.) was designed to eliminate the above undesirable requirement by providing a retention member which is removable from the rear of the reflector yet which also assures positive alignment of the unit's incandescent lamp within the reflector when said lamp is positioned therein. The retention member is secured to the lamp's sealed end and may comprise a metallic "can", a preformed component of insulative material such as ceramic, or a combination of both.

The projection unit of U.S. Pat. No. 4,219,870 (Haraden et al.) was designed as an improvement to the unit of U.S. Pat. No. 4,156,901 by providing means whereby the retention member having the lamp's sealed end therein could be removed from the front, concave reflecting portion of the glass reflector. As stated, the method of removal in U.S. Pat. No. 4,156,901 was via the rear neck (or collar) portion of the reflector. This earlier arrangement necessitated provision of a relatively large aperture (opening) in the reflector's neck portion thus reducing the total reflective surface of the reflector and, as a result, the unit's total forward output. In addition, rearward removal of the lamp in many projection systems currently available today can prove somewhat difficult due to the limited accessibility to this portion of the unit within most systems. The technique of forward (front) removal understandably overcomes the above and other, related disadvantages. In the unit defined in U.S. Pat. No. 4,219,870, a pair of retention members is utilized, one for retaining the sealed end of the lamp and aligning the lamp within the glass reflector while the other, an external clamping member, is slidably positioned within a pair of opposing, exterior slots in the glass reflector's neck portion and functions by slidably engaging upstanding tabs located on the portions of the boxlike first retention member which protrude from the rear of the reflector a necessary distance.

The present invention represents yet another improvement of the variety above by providing a projection unit which permits use of a relatively small opening in the glass reflector to accommodate the unit's lamp and first retention member, both of which are removable from the front of the reflector, and which utilizes a relatively small, compact resilient second retention member pivotally located on the first member and capable of being inserted through the reflector's rear opening during initial positioning of the lamp's first retention member component and thereafter being pivoted to engage a surface of the reflector and secure (or lock) the component in position.

It is believed therefore that a projection unit which provides the above improvements, as well as those defined in greater detail below, constitutes a significant advancement in the art.

DISCLOSURE OF THE INVENTION

It is therefore a primary object of the present invention to enhance the projection unit art by providing a projection unit which permits ready separation of the unit's projection lamp and glass reflector components and which also provides the several advantageous features described herein.

In accordance with one aspect of the invention, there is provided an improved projection unit which includes a glass reflector, an incandescent projection lamp, a first retention member which is removably oriented within the glass reflector and serves to align the lamp within the reflector, and a second retention member for retaining the first member within the glass reflector and permitting removal thereof through the reflector's front portion. The improvement to the unit comprises providing a second retention member which is resilient and is pivotally located on the first member for engaging a surface (e.g., back wall) of the glass reflector to effect retention of the first member within the reflector and for being secured while in this position.

BRIEF DESCRIPTION OF THE DRAWINGS

FIG. 1 is an exploded isometric view of a projection unit in accordance with a preferred embodiment of the invention;

FIGS. 2 and 3 are enlarged, partial side elevational views, partly in section, illustrating the steps of positioning the lamp and first retention member components of the invention within the opening provided within the invention's glass reflector; and FIG. 4 is a partial top view of the wireform retention member of the invention.

BEST MODE FOR CARRYING OUT THE INVENTION

For a better understanding of the present invention together with other and further objects, advantages and capabilities therefore, reference is made to the following disclosure and appended claims in connection with the above-described drawings.

With particular reference to FIGS. 1-3, there is illustrated a projection unit 10 in accordance with a preferred embodiment of the present invention. As stated, unit 10 is particularly adapted for use within a projection system such as a microfilm slide, or 16 mm. movie projector. Accordingly, projection unit 10 would be located within a suitable socket-holder assembly (not shown) such as described and shown in the aforementioned U.S. Pat. No. 3,789,212. Projection unit 10 includes a glass reflector 11 and an incandescent projection lamp 13 adapted for being located within reflector 11 (FIG. 3). A preferred lamp for use in unit 10 is one of the tungsten-halogen variety listed under ANSI Code ELH, and produced and sold by the assignee of the invention. This lamp produces 300 watts, is operable at normal line voltages, and possesses an average life of 35 hours. The envelope portion 15 of lamp 13 includes a CC8 tungsten filament structure 17 which is electrically connected within the lamp's press sealed end 19 (adjacent envelope 15) to a pair of contact pins 21 which project from end 19. Lamp 13 is thus activated when pins 21 are connected to a suitable socket component (not shown) and the corresponding projection system placed in operation. Other lamps suitable for use in unit 10 include those listed under ANSI Code ENH and ENX, said lamps also produced and sold by the assignee of this invention. ENH lamps operate at normal line voltages and are capable of producing 250 watts over an average life of 175 hours. ENX lamps produce 360 watts, operate at 82 volts, and are rated as having an average life of 75 hours. Both ENH and ENX tape lamps utilize a CC8 filament structure. Still other lamps for use in unit 10 include those producing from between about 50 to about 250 watts and operational at the relatively low voltage ranges of between 12 and 24 volts, and, in some cases, even lower. Lamps of this type typically use C6 or CC6 filaments and have an average operating life of between 25 and 100 hours. These latter defined lamps are listed under such ANSI Code designations as ENZ EJA, EJM, EJN, EJL, DED and ELC. The contact pins 21 typically employed in tungsten halogen lamps of the variety described above are of molybdenum or similar conductive material.

Reflector 11 is preferably made of hardglass (e.g., borosilicate) and includes a forward (or front) concave reflecting portion 23 and a hollow rear neck portion 25 adjacent thereto. Reflecting portion 23 is preferably elliptical in configuration and includes a dichroic mirror coating (not shown) on its interior surface to permit much of the heat generated by lamp 13 to pass therethrough while still reflecting the lamp's visible light output in a forward direction "A". Such coatings are known in the art and typically can withstand temperatures of 500 degrees Celsius with no resultant shift in characteristics.

As earlier stated, alignment between lamp 13 and reflector 11 is extremely critical in order to assure optimum forward output of unit 10. Understandably, alignment is also critical between unit 10 and the remaining elements of the overall projection system, such as the projector's film gate and projection lens. Such elements are well known in the prior art and are not illustrated here. To maintain said alignment between lamp 13 and reflector 11, a first retention member 31 is utilized and is fixedly secured to sealed end 19 of lamp 13 using, for example, a suitable bonding cement 32 (e.g. saureisen). Member 31, as illustrated, is metallic (e.g., No. 96 ga. steel) and is of a substantially boxlike configuration to thus encapsulate almost the entirety of sealed end 19. The function of member 31 is to retain lamp 13 in alignment within reflector 11 such that the envelope is oriented within concave portion 23 of reflector 11 and the lamp's sealed end 19 is located substantially within neck 25.

To accommodate retention member 31 (and therefore the sealed end 19 the lamp 13), rear neck portion 25 of reflector 11 includes a relatively small opening 33 therein. As stated, use of a small opening results in an increase in total internal reflective area to in turn provide a corresponding increase in total forward light output for the invention in comparison to the unit depicted in the aforementioned U.S. Pat. No. 4,156,901. Opening 33 is substantially rectangular in cross section to accommodate the similarly shaped boxlike member 31. In addition, this opening also includes a plurality of slots and grooves therein which function in the manner defined below.

It can also be seen in FIGS. 2 and 3 that a relatively large amount of glass material is provided in the sides of neck portion 25 of reflector 13, as well as the juncture location between concave portion 23 and neck 25. Added use of such material serves to strengthen reflector 13 in these areas, thus facilitating both handling and shipping of said component.

Lamp 13 is retained within reflector 11 such that the CC8 filament structure 17 lies on the reflector's optical axis OA-OA and in the focus of the ellipse of the reflector. In this position, the longitudinal axis of lamp 13 lies coincidental to axis OA-OA. To facilitate the aforementioned positioning of member 31 and alignment of lamp 13 within reflector 11, a pair of slots 41 are located within opposing (upper and lower) surfaces of opening 33 and terminate at a preestablished distance from the front surface 43 (FIG. 1) of the reflector. Slots 41 receive a corresponding pair of projections 45 which extend from opposite sides of boxlike retention member 31. Accordingly, this arrangement assures both proper rotational orientation of lamp 13 within the reflector as well as proper depth of insertion of retention member 31 within the reflector's rear neck portion. Although the drawings indicate that slots 41 are located directly opposite each other (from axis OA-OA), it is also within the scope of the invention to offset them to even further assure proper lamp orientation. It is also within the scope of this invention to utilize more than one such projection 45 on each opposing side. Because such combinations are within the scope hereof, further description will not be provided.

In the arrangement depicted in the drawings, boxlike retention member 31 is designed to fit snugly within opening 33 to provide the described necessary, critical alignment. To prevent this member from becoming displaced as might occur from the vibrations or other movements typically experienced in the operation and handling of projection systems, the invention includes a second retention member 51 which represents a significant improvement over the member described and illustrated in the aforementioned U.S. Pat. No. 4,219,870. Member 51 comprises a resilient wireform 53 which is pivotally oriented on first retention member 31 and adapted for rotational movement (from the non-securing position illustrated in FIGS. 1 and 2 to enable linear insertion of member 31 to the securing, locking position depicted in FIG. 3) thereon. Because the wireform is capable of functioning in this manner, it eliminates the added requirement of providing external slots in the neck 25 of reflector 11 and also substantially removes the opportunity for it being lost or misplaced, as might occur when using a separate component such as the clamp in U.S. Pat. No. 4,219,870. It can also be seen from the instant drawings that the second retention member of the invention is much simpler in construction and requires substantially less material to manufacture, thus reducing its cost over the member in U.S. Pat. No. 4,219,870.

Wireform 53 is metallic (e.g., stainless steel) and has a diameter within the range of about 0.020 to about 0.030 inch. In addition, wireform 53 includes a pair of coiled segments 55 (only 1 shown in FIG. 1) which are each aligned with and located on a respective one of a corresponding pair of pins 57 which project from opposing sides of member 31. As shown in FIG. 4, each of the pins 57 preferably projects from one of the sides of member 31 which serve to interconnect the sides of member 31 which include projections 45. To accommodate pins 57 in neck portion 25, a pair of opposed grooves 59 (FIG. 1) are provided within opposite side surfaces of the rectangular opening 33 and which extend to the rear, flat end surface or wall 61 of reflector 11. Grooves 59 are not illustrated in FIG. 3 for clarification purposes. Pins 57 thus serve two functions: (a) they accommodate the coiled segments 55 of wireform 53 to thus enable the defined rotational movement thereof; and (b) they serve to facilitate alignment of member 31 within reflector 11. In addition to grooves 59, rear opening 33 includes a pair of opposed channels 63 located within opposite side surfaces thereof to accommodate the corresponding portions of wireform 53 which run alongside member 31 and thus protrude from the member's side walls.

In FIG. 3, wireform 53 is shown as being positioned in its securing (or locking) position to provide the aforedefined securement of member 31 within opening 33. Wireform 53 has been rotated approximately 90 degrees to positively engage (and lie flush against) the planar back surface 61 of neck portion 25 and, in addition, has been locked in this position. Locking is accomplished by providing a pair of tab members 71 which project from opposite sides of member 31 (the same as pins 57) and engaging each of these tabs with a linear segment 73 of the wireform, each segment 73 adapted for catching the respective tab to thus prohibit easy release thereof. Engagement of back surface 61 is accomplished by a substantially U-shaped (or closed) segment 75 which provides a positive three-sided contact with surface 61. This form of engagement and securement thus also serves to substantially reduce the possibility of undesirable retention member 31-lamp 13 movement within reflector 11.

Although the type of securement illustrated and described above involves reflector engagement by the wireform's U-shaped segment 75 and tab locking by the linear segments 73, it is also within the scope of the invention to reverse the roles of these portions of retention member 51. That is, it is possible to engage rear wall 61 with linear segments 73 and lock the wireform by retaining the parallel leg portions (77) of U-shaped segment 75 within tabs 71. This will not, of course, provide the three-sided engagement cited above, but has still proven to be most effective.

Removal of lamp 13 and member 31 is accomplished by releasing linear segments 73 (e.g., by use of a simple pointed instrument such as a screwdriver) and thereafter grasping envelope 15 and pulling it in the forward direction. Quite understandably, this procedure is less complicated than release of the unit in U.S. Pat. No. 4,219,870 and also requires less space for accessability to accomplish same. Specifically, it is only necessary to provide a single, small aperture in the projector relative to the neck portion 25 of reflector 11 to permit insertion of the above releasing instrument.

While there have been shown and described what are at present considered the preferred embodiments of the invention, it will be obvious to those skilled in the art that various changes and modifications may be made therein without departing from the scope of the invention as defined by the appended claims.

I claim:

1. In a projection unit including a glass reflector having a front concave reflecting portion and a rear neck portion with an opening therein, an incandescent lamp including an envelope portion and a sealed end adjacent said envelope portion, a first retention member secured to said sealed end of said lamp for retaining said lamp therein and aligning said lamp within said reflector whereby said envelope portion will be positioned substantially within said front concave reflecting portion and said sealed end will be positioned substantially within said opening within said rear neck portion, said first retention member removably positioned within said opening and adapted for being removed through said front concave reflecting portion of said reflector, and a second retention member for retaining said first retention member within said opening of said reflector and permitting removal thereof through said front concave reflecting portion, the improvement wherein said second retention member comprises:
a resilient member pivotally positioned on said first retention member for engaging said rear neck portion of said reflector to effect said retention of said first retention member within said opening of said reflector and for being secured in said position of engagement with said rear neck portion.

2. The improvement according to claim 1 wherein said resilient member comprises a wireform pivotally positioned on opposing sides of said first retention member.

3. The improvement according to claim 2 wherein each of said opposing sides includes a pin member projecting therefrom and said wireform includes first and second coiled segments, each of said coiled segments being located on a respective one of said projecting pin members.

4. The improvement according to claim 3 wherein said opening within said rear neck portion of said reflector includes a pair of grooves located along opposed surfaces thereof, each of said grooves accommodating a respective one of said pin members during positioning of said first retention member within said opening.

5. The improvement according to claim 2 wherein said wireform includes a substantially U-shaped segment and said rear portion of said glass reflector includes a substantially planar rear surface, said U-shaped segment engaging said planar rear surface during said retention of said first retention member.

6. The improvement according to claim 2 wherein each of said opposing sides includes a protruding tab member, said wireform engaging said tab members to provide said securement of said resilient member.

7. The improvement according to claim 6 wherein said wireform includes first and second substantially linear segments, each of said linear segments engaging a respective one of said tab members to provide said securement.

8. The improvement according to claim 1 wherein said opening within said rear neck portion of said reflector includes a pair of slots located along opposing surfaces thereof and said first retention member includes first and second projections extending from opposite sides thereof, each of said projections aligning with and being positioned within a respective one of said slots when said first retention member is positioned within said opening.

9. The improvement according to claim 6 wherein said glass reflector includes a substantially planar rear surface and said wireform is capable of retaining said first retention member in either of two orientations, said wireform including a substantially U-shaped linear segment and first and second substantially linear segments, said U-shaped segment adapted for engaging said rear surface of said reflector and each of said linear segments adapted for engaging a respective one of said tab members to retain said first retention member in a first of said two orientations of said wireform, said linear segments adapted for engaging said rear surface of said reflector and said U-shaped segment adapted for engaging said tab members in a second of said two orientations of said wireform to retain said first retention member.

* * * * *